United States Patent
Schippl et al.

(10) Patent No.: US 10,151,521 B2
(45) Date of Patent: Dec. 11, 2018

(54) METHOD FOR COOLING A PLANT FOR SUPERCONDUCTIVE CABLES

(71) Applicant: NEXANS, Paris (FR)

(72) Inventors: Klaus Schippl, Hannover (DE); Mark Stemmle, Hannover (DE); Frank Schmidt, Langenhagen (DE)

(73) Assignee: NEXANS, Courbevoie (FR)

( * ) Notice: Subject to any disclaimer, the term of this patent is extended or adjusted under 35 U.S.C. 154(b) by 206 days.

(21) Appl. No.: 13/693,172

(22) Filed: Dec. 4, 2012

(65) Prior Publication Data

US 2014/0150471 A1   Jun. 5, 2014

(30) Foreign Application Priority Data

Dec. 19, 2011   (EP) .................................... 11306694

(51) Int. Cl.
*F25D 3/10*     (2006.01)
*H01B 12/16*    (2006.01)

(52) U.S. Cl.
CPC ............... *F25D 3/10* (2013.01); *H01B 12/16* (2013.01); *Y02E 40/647* (2013.01)

(58) Field of Classification Search
CPC ....... F17C 2205/013; F17C 2205/0138; H01B 12/16; Y02E 40/647; F25D 3/10
USPC .................. 174/15.4; 62/50.1, 50.2, 51.1
See application file for complete search history.

(56) References Cited

U.S. PATENT DOCUMENTS

| | | | |
|---|---|---|---|
| 3,710,584 A * | 1/1973 | Leonard | 62/48.2 |
| 7,979,976 B2 * | 7/2011 | Soika et al. | 174/125.1 |
| 2005/0061367 A1 * | 3/2005 | Barr | G05D 11/135 137/93 |
| 2005/0193743 A1 * | 9/2005 | Foss | C21D 1/62 62/50.2 |
| 2007/0006598 A1 * | 1/2007 | Laskaris et al. | 62/51.1 |
| 2011/0152103 A1 * | 6/2011 | Soika et al. | 62/51.1 |
| 2012/0200089 A1 * | 8/2012 | Deandrea | F03B 13/10 290/54 |

* cited by examiner

*Primary Examiner* — Orlando E Aviles Bosques
(74) *Attorney, Agent, or Firm* — Softer & Haroun, LLP

(57) ABSTRACT

A method for cooling a plant for superconductive cables is provided, where the plant includes two thermally insulated end closures (1, 2) and at least one thermally insulated, tubular cryostat (3) arranged between the end closures, in which at least one superconductive cable is arranged. Liquid nitrogen contained in a cooling agent supply is pumped by means of a pump (9) through a first end closure and the cryostat to a second end closure. At least one vacuum insulated tank (7) is used for the cooling agent supply, where the tank (7) contains nitrogen at operating temperature and out of which the nitrogen is pumped. For making available a quantity of liquid nitrogen necessary for operating the plant, the supply of liquid nitrogen contained in the tank (7) is supplemented during operation or is switched over to another tank (10) containing liquid nitrogen.

1 Claim, 1 Drawing Sheet

METHOD FOR COOLING A PLANT FOR SUPERCONDUCTIVE CABLES

RELATED APPLICATION

This application claims the benefit of priority from European Patent Application No. 11 306 694.8, filed on Dec. 19, 2011, the entirety of which is incorporated by reference.

BACKGROUND

Field of the Invention

The invention relates to a method for cooling a plant for superconductive cables which includes two thermally insulated end closures and at least one thermally insulated, tubular cryostat, in which at least one superconductive cable is arranged by means of which liquid nitrogen contained in a cooling agent supply is pumped by means of a pump through a first end closure and the cryostat to a second end closure (EP 2 328 156 A1).

Description of Related Art

In today's technology, superconductive cables have electrical conductors of a composite material containing ceramic material that changes over into the superconductive state at sufficiently low temperatures. The electrical direct current resistance of a correspondingly built conductor is zero with sufficient cooling, as long as a certain voltage has not been exceeded. Suitable ceramic materials are, for example, BSCCO (bismuth-strontium-calcium-copper oxide) as material of the first generation or ReBCO (rare-earth-barium, copper oxide), particularly YBCO (yttrium-barium-copper oxide) as materials of the second generation. In conventional technology, such superconductive conductors are cooled with liquid nitrogen which, for this purpose, has a temperature of operation of usually less than 77K.

For cooling the nitrogen to the stated temperature, known methods utilize cooling units to which pumps are connected by means of which liquid nitrogen is pumped with sufficient pressure into an end closure and through the cryostat to the other, second end closure. Such a method is described, for example, in the above mentioned EP 2 328 156 A1. The nitrogen can be conveyed from the second end closure for renewed cooling to operating temperature by a suitable pipe to the respective cooling unit. This unit is, in its totality, complicated and the known cooling units have parts which are subject to wear and may have to be replaced if necessary. Therefore, such a cooling unit requires continuous maintenance.

OBJECTS AND SUMMARY

It is the object of the present invention to simplify the above described method.

In accordance with the invention, this object is met in that, for the cooling agent supply, at least one vacuum-insulated tank is used in which the nitrogen, which is at for making available a quantity of liquid nitrogen necessary for operating the plant, the supply of liquid nitrogen contained in the tank is supplemented during operation, or is switched to another tank containing liquid nitrogen.

This method operates almost maintenance free since no parts that are subject to wear are present for cooling the nitrogen. A tank filled with liquid nitrogen is made available for purchase by the plant operator, from the producer of the nitrogen. In a preferred embodiment, the nitrogen can be refilled in time intervals during running operation. However, it is also possible to use a second tank to which the supply of the plant may be switched for supplying the plant without interruption of the operation.

As the distance from the feeding location of the plant increases, the nitrogen gradually warms and is advantageously returned into the tank in which it can evaporate. The cold gas produced during evaporation can then be utilized advantageously for additionally cooling the plant components, such as, for cooling the end closures.

If, for example, during direct current operation of the plant, two cryostats are arranged between the two end closures, each of which contains a superconductive cable, then a tank with liquid nitrogen can also be connected to the second end closure.

BRIEF DESCRIPTION OF THE DRAWINGS

The method according to the invention will be explained with the aid of embodiments shown in the drawings.

In the drawing.

Figure 1:
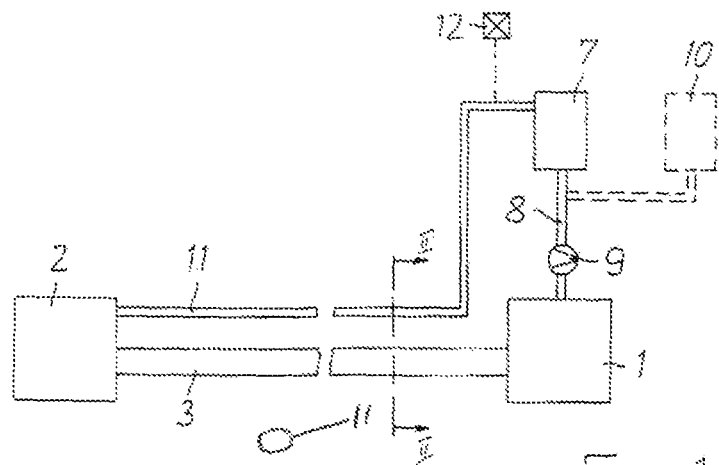
FIG. 1 is a schematic illustration of a plant with at least one superconductive cable.

DETAILED DESCRIPTION in FIG. 1, a first end closure 1 and a second end closure 2 are schematically illustrated. A cryostat 3 is arranged between the end closures 1 and 2. The end closures 1 and 2, as well as the cryostat 3, are known per se. Accordingly, their precise configuration is not discussed here.

Figure 2:
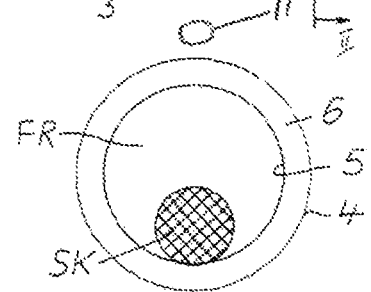
FIG. 2 is a partial sectional view, on a larger scale, of the cryostat of FIG. 1, along sectional line II-II of FIG. 1.

An end closure 1 or 2 consists basically of a vacuum-insulated housing in which all electrical components for connecting at least one electrical superconductive cable are contained, and which includes a passage for connecting further electrical cables which are to be operated at normal temperature. A cryostat 3 consists basically of at least one metal pipe which is thermally insulated. In accordance with FIG. 2 such a cryostat 3 can also have two metal pipes 4 and 5 which are arranged at a distance and concentrically relative to each other, between which a vacuum insulation 6 is mounted.

At least one electrically superconductive cable SK is arranged in the cryostat 3, wherein the construction of the cable SK is also basically known. Therefore, the cable is not further discussed here in detail. The cryostat 3 additionally encloses a free space FR through which, during operation of the plant, liquid nitrogen is conducted as the cooling agent for the superconductive cable SK.

Also belonging to the plant is a vacuum insulated tank 7 which contains liquid nitrogen. The tank 7 is connected through a thermally insulated pipeline 8 to the first end closure 1. The pump 9 is connected to the pipeline. A second tank 10 which may be provided is shown in broken lines. The second tank 10 can be connected to the first end closure 1 when the first tank 7 no longer contains sufficient liquid nitrogen. The tank 7—possibly also the tank 10—is connected to the second end closure 2 through a thermally insulated pipeline 11. In order to maintain a predeterminable pressure level in the plant, a pressure control valve 12 can be mounted in pipeline 11, in front of the inlet into the tank 7 (or 10).

The method according to the invention is carried out, for example, as follows:

After switching through all electrical conveying paths—prior to the actual switching on of the electrical voltage—liquid nitrogen is conducted by means of the pump 9 into the first end closure 1 and is pumped with sufficient pressure through the end closure 1 and the cryostat 3 to the second end closure 2. As soon as the superconductive cable SK has sufficiently cooled, the latter can be connected to an electrical voltage source. Cooling of the cable SK is maintained by a continuous supply of liquid nitrogen from the tank 7. Advantageously, the supply of liquid nitrogen is continuously supplemented in the tank 7 during operation in order to maintain a sufficient level for a safe operation of the plant.

If applicable, the supply of liquid nitrogen can also be switched over to the tank 10. The tank 7 can then again be filled. In this manner, the liquid nitrogen can be switched back and forth between the tanks 7 and 10 for a continuous sufficient supply of the liquid nitrogen to the plant.

In accordance with a preferred embodiment of the method, the nitrogen, which has become warm when reaching the second end closure 2 at the end of its conveying path, is returned through the pipeline 11 into the tank 7. The nitrogen can then evaporate in the tank 2. The cold gas produced during the evaporation can advantageously be utilized for additionally cooling the plant components, for example, for cooling the end closures. The gaseous phase of the nitrogen, which has been warmed almost to ambient temperature, can be discharged into the surrounding area.

Figure 3:
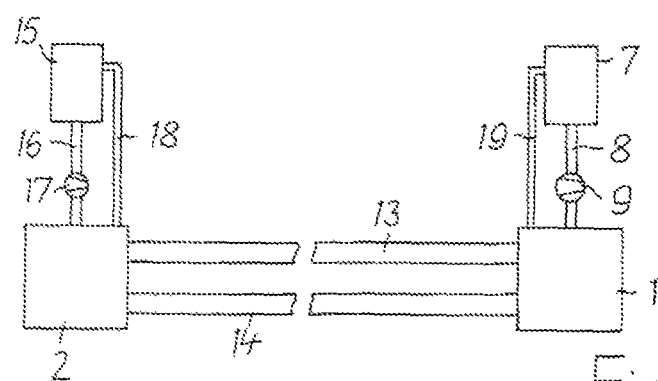
FIG. 3 is an illustration of an embodiment of the plant which is supplemented compared to FIG. 1.

The method according to the invention can also be advantageously used if, in the case of direct current transmission according to FIG. 3, two cryostats 13 and 14 are placed between the two end sections 1 and 2 which each contain a superconductive cable for separately conveying the two polarities. In such a plant, an additional vacuum insulated tank 15 which contains liquid nitrogen can be arranged in the area of the second end closure. The nitrogen is conveyed to the second end closure 2, possibly through a thermally insulated pipeline 16 to which a pump 17 is connected.

The method for cooling this plant is advantageously carried out in such a way that liquid nitrogen is conveyed to the first end closure 1 and is pumped through the cryostat 13 to the second end closure 2. At that location, the heated nitrogen can be conducted through the thermally insulated pipeline 18 into the tank 15 with the additional cooling effect of the cold gas as described above.

Simultaneously, liquid nitrogen is conducted out of the tank 15 to the second end closure 2, and is pumped through the cryostat 14 to the first end closure 1. From there the heated nitrogen can them be conducted through a thermally insulated pipeline 19 into the tank 7.

For maintaining a certain predetermined pressure level in the plant, it is possible also in this embodiment with two tanks 7 and 15, to install a pressure regulating valve in front of the respective tank inlet in the return pipeline.

The invention claimed is:

1. Method for cooling a plant for superconductive cables, which has a first thermally insulated end closure and a second thermally insulated end closure and at least one thermally insulated tubular cryostat arranged between the end closures, in which at least one superconductive cable is arranged in the cryostat, and in which liquid nitrogen is pumped by a pump through the first thermally insulated end closure and the cryostat to the second thermally insulated end closure, said method comprising the steps of:

installing a first vacuum insulated tank proximal to the first thermally insulated end closure;

connecting the vacuum insulated tank via a thermally insulated pipeline to the first thermally insulated end closure;

connecting said pump to the thermally insulated pipeline;

installing a second tank and connecting said second tank to the first thermally insulated end closure;

filling operating temperature liquid nitrogen into said first and second tanks;

supplying said operating temperature liquid nitrogen to said plant from said first vacuum insulated tank, wherein said liquid nitrogen is pumped out of the first vacuum insulated tank to said first end closure through said thermally insulated pipeline, then flows into said at least one thermally insulated tubular cryostat and then to said second thermally insulated end closure, refilling liquid nitrogen into the first vacuum insulated tank in time intervals during operation of said plant or supplementing the liquid nitrogen contained in the first vacuum insulated tank, by supplying liquid nitrogen from the second vacuum insulated tank containing liquid nitrogen, for making available a quantity of liquid nitrogen required for operating the plant, wherein the liquid nitrogen that gradually warmed when flowing to the second thermally insulated end closure, is returned from the second thermally insulated end closure into said first vacuum insulated tank through a thermally insulated pipe, said returned liquid nitrogen evaporates within the first vacuum insulated tank producing cold gas, employing said cold gas for cooling the plant components contained in the end closures, and mounting, for maintaining a predeterminable pressure level in the plant, a pressure control valve in the thermally insulated pipe in front of an inlet of the first vacuum insulated tank.

* * * * *